US012657033B2

(12) United States Patent
Christopher et al.

(10) Patent No.: US 12,657,033 B2
(45) Date of Patent: Jun. 16, 2026

(54) TECHNIQUES OF ENCRYPTING BMC AND BIOS FIRMWARE AND DATA IN FLASH MEMORY USING CO-PROCESSOR

(71) Applicant: American Megatrends International, LLC, Duluth, GA (US)

(72) Inventors: Samvinesh Christopher, Suwanee, GA (US); Anurag Bhatia, Sugar Hill, GA (US); Winston Thangapandian, Suwanee, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 109 days.

(21) Appl. No.: 18/370,058

(22) Filed: Sep. 19, 2023

(65) Prior Publication Data
US 2025/0094176 A1     Mar. 20, 2025

(51) Int. Cl.
*G06F 9/4401*          (2018.01)
*G06F 9/38*            (2018.01)

(52) U.S. Cl.
CPC .......... *G06F 9/4403* (2013.01); *G06F 9/3877* (2013.01)

(58) Field of Classification Search
CPC ............................ G06F 9/4403; G06F 9/3877
See application file for complete search history.

(56) References Cited

U.S. PATENT DOCUMENTS

| | | | | |
|---|---|---|---|---|
| 5,029,073 A * | 7/1991 | Takaya | .................. | G06F 9/3877 712/34 |
| 6,065,027 A * | 5/2000 | Cashman | ............ | G06F 9/30072 708/203 |
| 6,839,849 B1 * | 1/2005 | Ugon | ...................... | G06F 21/77 712/E9.067 |
| 8,904,507 B2 * | 12/2014 | Maity | ..................... | G06F 21/36 709/225 |
| 10,515,218 B2 | 12/2019 | Ghetie et al. | | |
| 10,747,295 B1 * | 8/2020 | Paaske | .................. | G06F 1/3287 |
| 10,868,743 B2 | 12/2020 | Slaight et al. | | |
| 10,956,157 B1 * | 3/2021 | Kaplan | ................. | G06F 9/3838 |
| 11,487,621 B1 * | 11/2022 | Montero | ............. | G06F 11/0772 |
| 11,580,225 B2 * | 2/2023 | Luciani, Jr. | ............. | G06F 21/57 |
| 2003/0120605 A1 * | 6/2003 | Fontana | .................. | G06F 21/10 705/59 |
| 2004/0068727 A1 * | 4/2004 | Zilles | ...................... | G06F 8/456 718/100 |
| 2004/0196905 A1 * | 10/2004 | Yamane | ................. | H04N 19/89 375/E7.076 |
| 2004/0255111 A1 * | 12/2004 | Lim | ....................... | G06F 15/177 713/2 |
| 2004/0268107 A1 * | 12/2004 | Zimmer | ................ | G06F 9/4408 713/1 |
| 2006/0053246 A1 * | 3/2006 | Lee | .......................... | G11C 7/20 711/100 |

(Continued)

*Primary Examiner* — Faisal M Zaman
(74) *Attorney, Agent, or Firm* — Tim Tingkang Xia, Esq.; TROUTMAN PEPPER LOCKE LLP

(57)          ABSTRACT
In an aspect of the disclosure, a method, a computer-readable medium, and an apparatus are provided. The apparatus is a BMC. The BMC obtains data to be written to a storage. A main processor of the BMC provides the data to a co-processor of the BMC. The co-processor encrypts the data into encrypted data. The co-processor stores the encrypted data to the storage.

8 Claims, 4 Drawing Sheets

(56) References Cited

U.S. PATENT DOCUMENTS

| | | | | |
|---|---|---|---|---|
| 2007/0115709 A1* | 5/2007 | Shih | G06F 11/2289 | |
| | | | | 365/63 |
| 2009/0006859 A1* | 1/2009 | Zimmer | G06F 21/575 | |
| | | | | 713/186 |
| 2009/0216998 A1* | 8/2009 | Machulsky | G06F 9/5044 | |
| | | | | 712/34 |
| 2012/0079281 A1* | 3/2012 | Lowenstein | H04L 9/0618 | |
| | | | | 713/189 |
| 2013/0088335 A1* | 4/2013 | Babu | H04L 67/34 | |
| | | | | 340/10.51 |
| 2013/0138934 A1* | 5/2013 | Lin | G06F 9/4411 | |
| | | | | 713/1 |
| 2015/0026459 A1* | 1/2015 | Divakar | H04N 21/23476 | |
| | | | | 713/160 |
| 2017/0147798 A1* | 5/2017 | Yi | G06F 21/14 | |
| 2018/0039552 A1* | 2/2018 | Moskowiz | G06F 11/2028 | |
| 2018/0089435 A1* | 3/2018 | Zander | G06F 21/577 | |
| 2019/0173749 A1* | 6/2019 | Thomas | G06F 9/451 | |
| 2020/0104141 A1* | 4/2020 | Balakrishnan | G06F 9/4406 | |
| 2020/0133712 A1* | 4/2020 | Rathineswaran | G06F 9/44521 | |

| | | | | |
|---|---|---|---|---|
| 2020/0134185 A1* | 4/2020 | Cho | G06F 21/602 | |
| 2021/0064734 A1* | 3/2021 | Chen | G06F 21/575 | |
| 2021/0216638 A1* | 7/2021 | Park | G06F 21/572 | |
| 2021/0326273 A1* | 10/2021 | Dodds | G06F 12/1009 | |
| 2022/0066766 A1* | 3/2022 | Mysore Shantamurthy | | |
| | | | G06F 9/4416 | |
| 2022/0278855 A1* | 9/2022 | Jacquin | H04L 9/3247 | |
| 2022/0311596 A1* | 9/2022 | Boesgaard | H04L 9/0625 | |
| 2022/0398144 A1* | 12/2022 | Cho | G06F 11/0721 | |
| 2023/0034526 A1* | 2/2023 | Cho | G06F 11/0772 | |
| 2023/0119255 A1* | 4/2023 | Soubhi | G06F 21/602 | |
| | | | | 713/193 |
| 2023/0161658 A1* | 5/2023 | Tung | G06F 11/141 | |
| | | | | 714/48 |
| 2023/0237155 A1* | 7/2023 | Jacquin | G06F 21/57 | |
| | | | | 713/168 |
| 2023/0251866 A1* | 8/2023 | Lin | G06F 21/575 | |
| | | | | 713/2 |
| 2023/0409211 A1* | 12/2023 | Lin | G06F 3/0622 | |
| 2024/0028538 A1* | 1/2024 | Kodama | G06F 13/38 | |
| 2024/0134989 A1* | 4/2024 | Veluthakkal | G06F 21/575 | |
| 2024/0232110 A1* | 7/2024 | Som | G06F 13/1678 | |
| 2024/0303086 A1* | 9/2024 | Liu | G06F 9/4406 | |

* cited by examiner

300

302  obtain data to be written to a storage 304  provide the data to a co-processor 306  encrypt the data into encrypted data 308  store the encrypted data to the storage 310  obtain encrypted data from the storage 312  decrypt the encrypted data from the storage into decrypted data 314  provide the decrypted data to the main processor

TECHNIQUES OF ENCRYPTING BMC AND BIOS FIRMWARE AND DATA IN FLASH MEMORY USING CO-PROCESSOR

BACKGROUND

Field

The present disclosure relates generally to computer systems, and more particularly, to techniques of encrypting baseboard management controller (BMC) and basic input/output system (BIOS) firmware and data in flash memory.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC obtains data to be written to a storage. A main processor of the BMC provides the data to a co-processor of the BMC. The co-processor encrypts the data into encrypted data. The co-processor stores the encrypted data to the storage.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
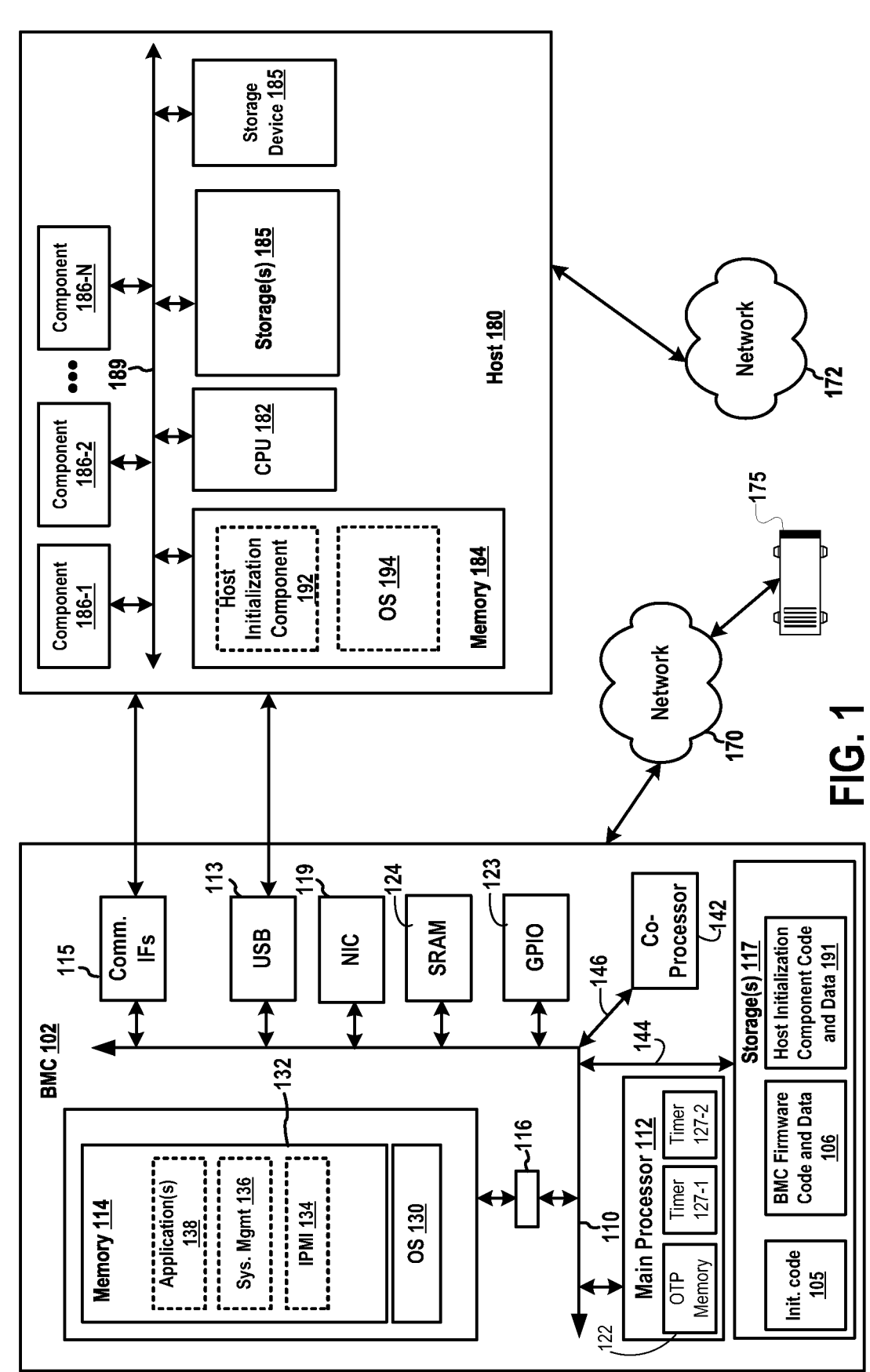
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the main processor 112 contains an OTP memory 122 (i.e., one time programmable memory). The main processor 112 also may contain one or more hardware timers such as a timer 127-1 and a timer 127-2. The functionalities of the timers 127-1, 127-2 are provided by the hardware components of the main processor 112, rather than based on software programming.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 602 shown in FIG. ???6.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144. In addition, a co-processor 142 is communication with the main processor 112 through a direct link 147 or through sharing the memory 114. The storage(s) 117 further stores co-processor initialization code/data 105 that is used by the main processor 112 to initialize the co-processor 142.

A co-processor is an additional processor that works alongside the main processor in a computer system. The co-processor may offload work from the main processor. The co-processor can execute specialized tasks independently from the main processor, allowing the main processor to focus on general computation and system control. This improves overall system performance.

The co-processor may accelerate specific workloads. Co-processors are designed to accelerate performance for particular workloads like encryption/decryption, graphics processing, signal processing etc. By offloading these specific tasks, the co-processor can complete them much faster than the general-purpose main processor.

The co-processor may access to peripherals. Co-processors often have direct access to I/O devices and peripherals like network cards, storage devices etc. This allows them to transfer and process data without involving the main processor.

The co-processor may run its own software. Co-processors can run their own software and code independently of the main processor. This code is loaded by the main processor during boot-up. The co-processor can then undertake assigned tasks autonomously.

Co-processors communicate with the main processor through shared memory, interrupt handling, messaging, and APIs. This allows coordinating tasks, sharing data, and notifying each other of results.

The BMC firmware code and data 106 and the host initialization component code and data 191 stored in the storage(s) 117 may contain sensitive information such as authentication keys, user information, and host information. Unauthorized access to this sensitive information could compromise the security of the server. Typically, server administrators implement security measures to restrict access to this sensitive data.

However, when a server is decommissioned, the storage devices may be removed or data may be erased without proper precautions. The flash memory chips containing the BMC firmware code and data 106 and the host initialization component code and data 191 are often overlooked during decommissioning. An attacker with physical access to these discarded flash memory chips can easily extract the sensitive data.

Recently, source code for many BMC and BIOS firmware has been open sourced (e.g. Open BMC and Open UEFI). This allows attackers to more easily decode the extracted firmware images. For ease of administration, servers within a datacenter often use identical BMC and BIOS firmware. Thus, compromised firmware from one discarded server could expose all servers in that datacenter.

Figure 2:
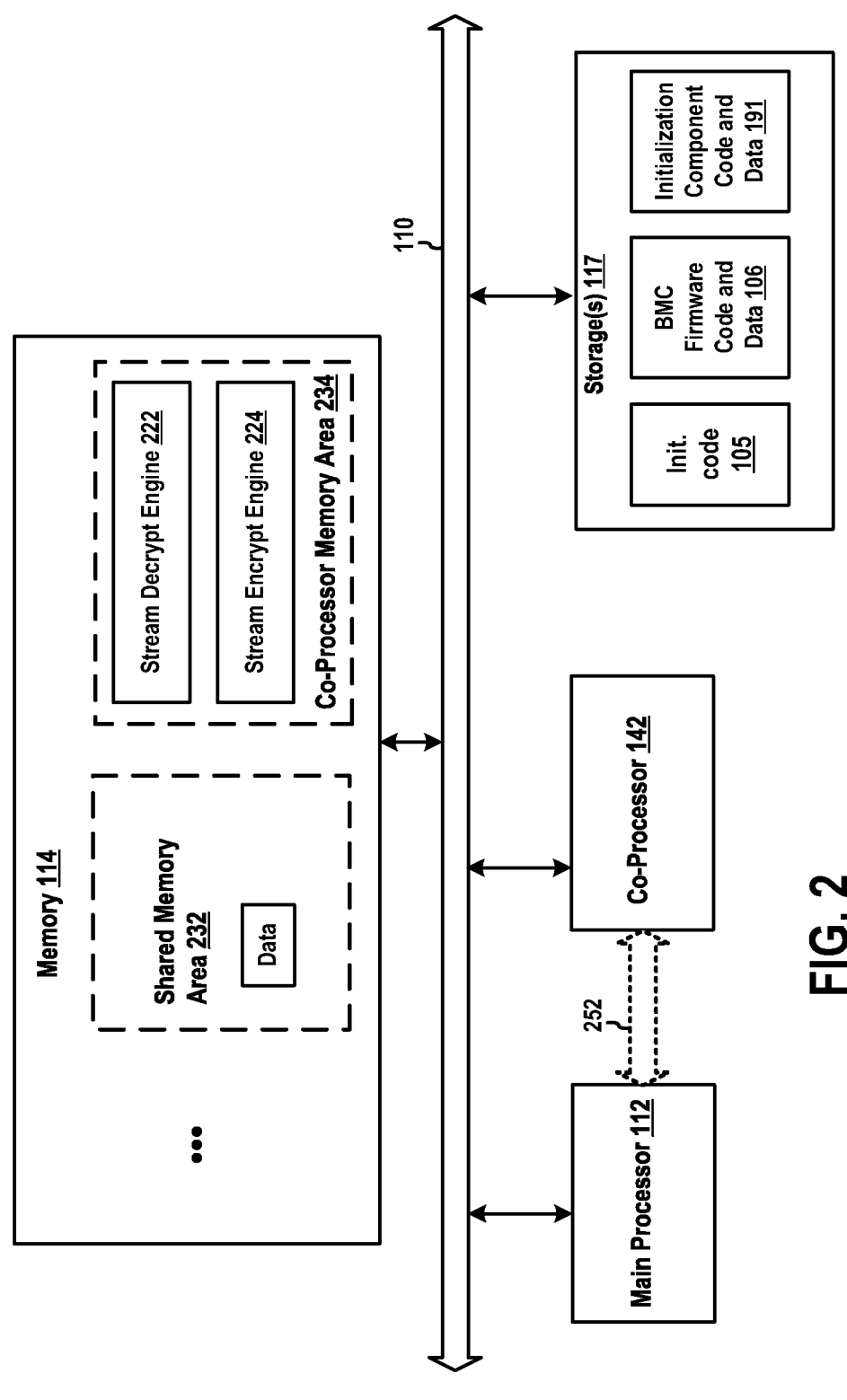
FIG. 2 is a diagram illustrating a security mechanism to encrypt code and data stored in a storage such as a Serial Peripheral Interface (SPI) flash memory chip.

FIG. 2 is a diagram 200 illustrating a security mechanism to encrypt code and date stored in a storage such as a Serial Peripheral Interface (SPI) flash memory chip. As described supra, the memory 114 contains a shared memory area 232 that is shared by the main processor 112 and the co-processor 142. Accordingly, through the shared memory area 232, the main processor 112 and the co-processor 142 may communicate and share data with each other.

The storage(s) 117 contains the co-processor initialization code/data 105, which are un-encrypted. After power on or reboot, the main processor 112 executes the co-processor initialization code/data 105 to initialize the co-processor 142. When the co-processor 142 is initialized, the co-processor 142 further loads a stream decrypt engine 222 and a stream encrypt engine 224 into a co-processor memory area 234 of the memory 114. Utilizing the stream encrypt engine 224 and the stream decrypt engine 222, the co-processor 142 can provide functions of encrypting data and decrypting data to the main processor 112 through an API 252. The main processor 112, the co-processor 142, the memory 114, and the storage(s) 117 are in communication with each other through the communication channel 110.

The co-processor 142 runs the stream encrypt engine 224 and the stream decrypt engine 222 to function as a stream cipher that encrypts and decrypts data as a continuous stream of bits or bytes. For data writes from the main processor 112 to the storage(s) 117, the main processor 112 writes the data to the shared memory area 232 and calls, through the API 252, the co-processor 142 to handle the data. Accordingly, the co-processor 142 reads the data in the shared memory area 232 and passes them through the stream encrypt engine 224, which encrypts the data stream before it is written to the storage(s) 117. The co-processor 142 may return the address/location/pointer of the data stored in the storage(s) 117 to the main processor 112 through the API 252.

For example, the authentication keys, user information, and host information as described supra pass through the stream encrypt engine 224 as a stream of bits, which are then encrypted into a stream of encrypted bits to be stored at the storage(s) 117.

For data reads from the storage(s) 117 to the main processor 112, the main processor 112 calls the co-processor 142 through the API 252 and may provide the address/location/pointer of the encrypted data stored in the storage(s) 117. The co-processor 142 retrieves the encrypted data from the storage(s) 117 and passes the encrypted data stream through the stream decrypt engine 222, which decrypts the data before loading them into the shared memory area 232 at a particular address. The API 252 called by the main processor 112 may provide the particular address to the main processor 112. Accordingly, the main processor 112 reads the decrypted data from the particular address of the shared memory area 232.

The co-processor 142 is in between the main processor 112 and the storage(s) 117 to handle data reads and writes. This allows the stream encrypt engine 224 and the stream decrypt engine 222 to encrypt and decrypt the data streams to and from the storage(s) 117.

Further, the stream encryption and decryption are performed in a format-preserving manner, meaning the size of the input data stream equals the size of the output data stream. Each unencrypted byte from the main processor 112 is encrypted at the stream encrypt engine 224 into an encrypted byte, and each encrypted byte from the storage(s) 117 is decrypted at the stream decrypt engine 222 into an unencrypted byte. This allows the encrypted data to be stored in the same location in the storage(s) 117 as the unencrypted data, without any awareness or changes needed in the BMC firmware or host initialization component code.

The stream encryption and decryption use a unique key. The key could be derived from a unique ID or serial number of the main processor 112 or other BMC hardware component. Using a unique key for each hardware instance binds the encrypted data tightly to that specific co-processor 142. This adds additional security, as a compromised key from one hardware unit cannot be used to decrypt data from other hardware units.

Figure 3:
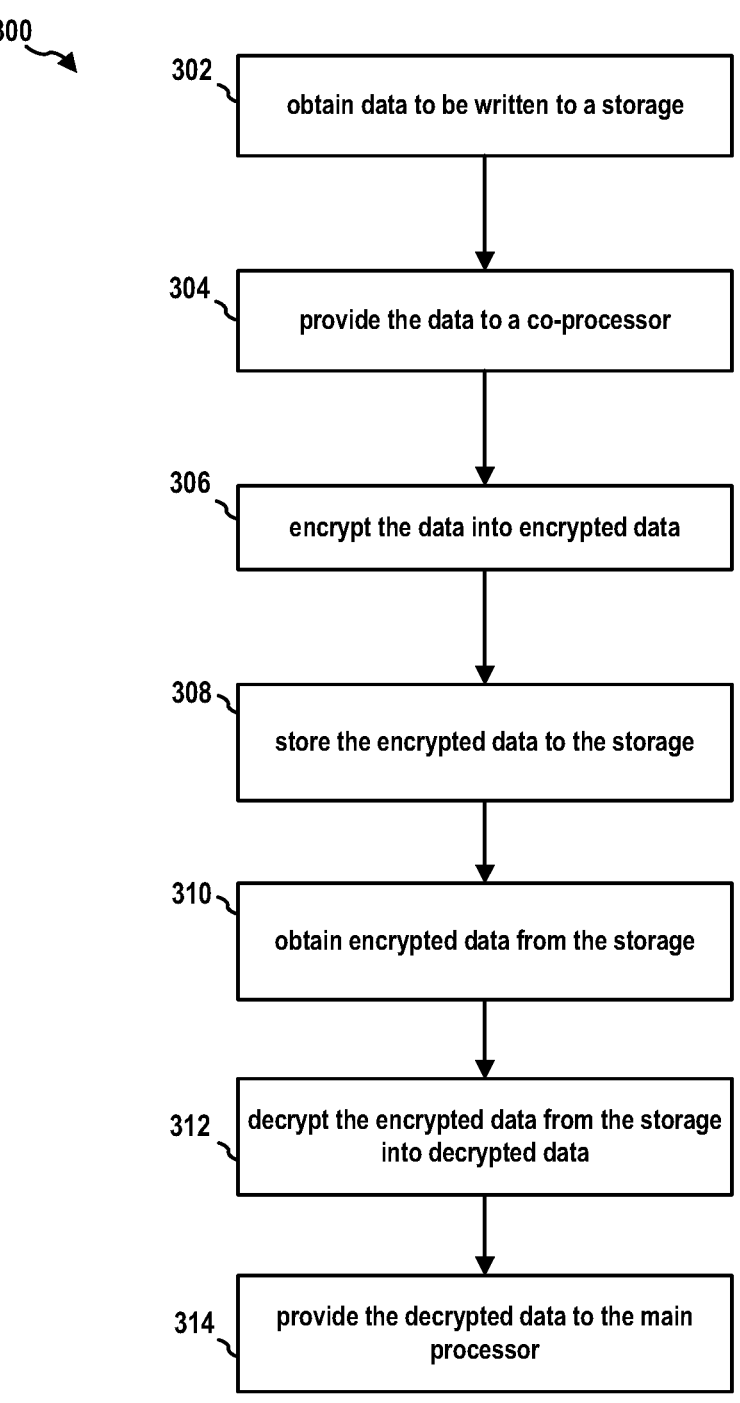
FIG. 3 is a flow chart of a process (method) of encrypting code and data for storing in a storage.

FIG. 3 is a flow chart 300 of a process (method) of encrypting code and data for storing in a storage. The method may be performed by a BMC (e.g., BMC 102). In operation 302, the BMC obtains data to be written to a storage (e.g., storage(s) 117). In operation 304, a main processor (e.g., main processor 112) of the BMC provides the data to a co-processor (e.g., co-processor 142) of the BMC. The main processor may provide the data to the co-processor via a shared memory area (e.g., shared memory area 232) accessible by both the main processor and the co-processor.

In operation 306, the co-processor encrypts the data from the shared memory area into encrypted data. The encryption may utilize a stream encryption engine (e.g., stream encrypt engine 224) executed by the co-processor. In operation 308, the co-processor stores the encrypted data to the storage.

To retrieve data from the storage, in operation 310, the co-processor obtains encrypted data from the storage. In operation 312, the co-processor decrypts the encrypted data from the storage into decrypted data. The decryption may utilize a stream decryption engine (e.g., stream decrypt engine 222) executed by the co-processor. In operation 314, the co-processor provides the decrypted data to the main processor. The co-processor may provide the decrypted data to the main processor via the shared memory area.

In certain configurations, the co-processor encrypts and decrypts the data streams in a format-preserving manner such that the size of input data equals the size of output data. In certain configurations, the encryption and decryption utilize a unique key derived from a unique identifier of a hardware component of the BMC, such as the main processor. In certain configurations, the storage comprises a flash memory storing firmware code and data for the BMC and a host computer (e.g., host computer 180).

Figure 4:
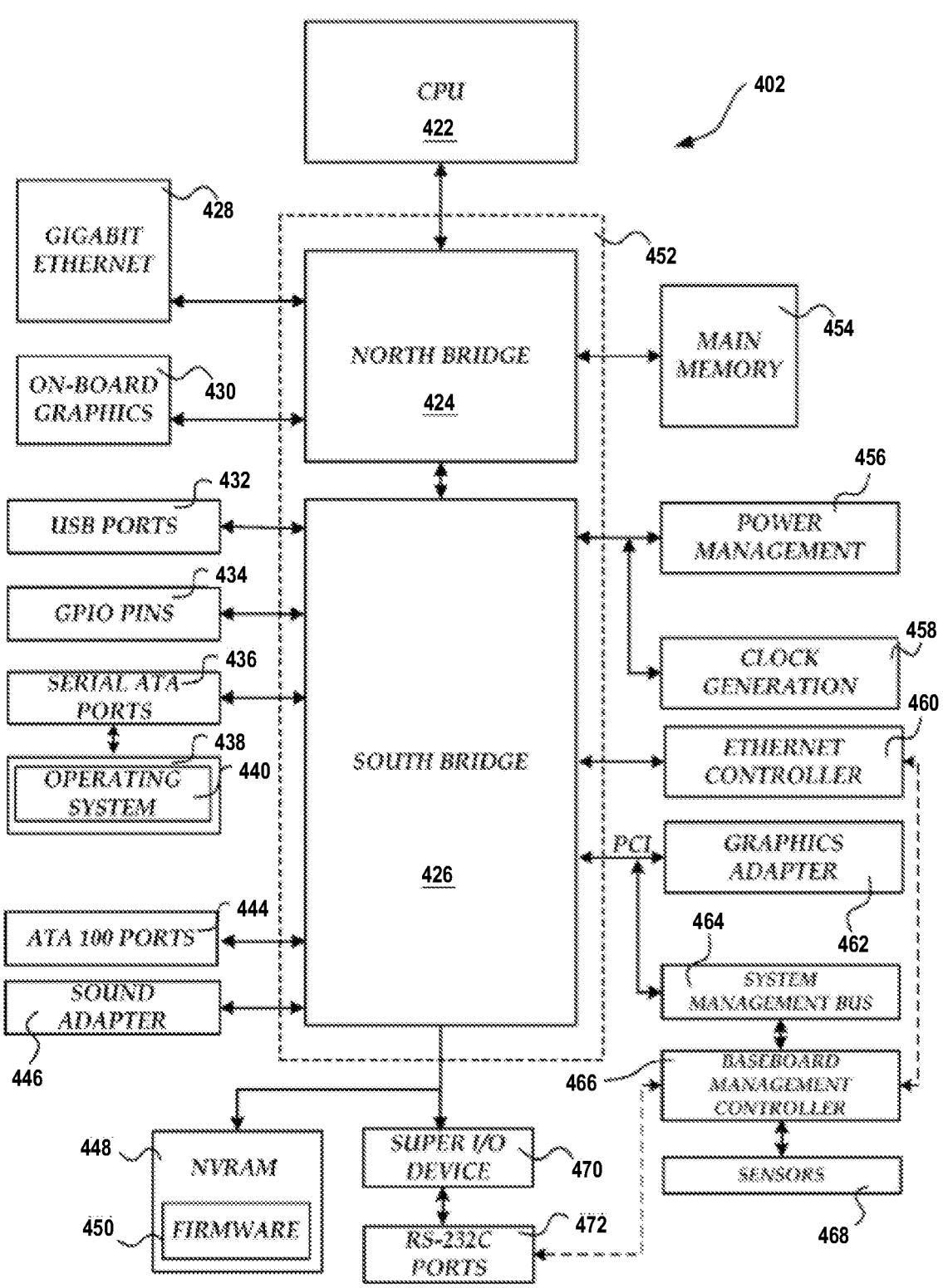
FIG. 4 shows an architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 180, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a key board port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including hand-held computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a baseboard management controller (BMC), the method comprising:

after power on of the BMC, executing, by a main processor of the BMC, unencrypted co-processor initialization code from a storage to initialize a co-processor of the BMC, wherein the storage further stores BMC firmware code and data and host initialization component code and data, and wherein the unencrypted co-processor initialization code is stored unencrypted in the storage while at least a portion of the BMC firmware code and data and at least a portion of the host initialization component code and data are stored encrypted in the storage;

obtaining data to be written to the storage;

writing, by the main processor of the BMC, the data to a shared memory area accessible by both the main processor and the co-processor of the BMC;

calling, by the main processor through an API, the co-processor to handle the data in the shared memory area;

reading, by the co-processor, the data from the shared memory area;

encrypting, by the co-processor, the data from the shared memory area into encrypted data via a stream encryption engine executed by the co-processor utilizing a unique key derived from a unique identifier stored in a one time programmable (OTP) memory of a hardware component of the BMC, wherein the encrypting is performed in a format-preserving manner such that a size of the data equals a size of the encrypted data; and storing, by the co-processor, the encrypted data to the storage at a target location such that the encrypted data occupies a same set of storage addresses in the storage as the data.

2. The method of claim 1, further comprising:

obtaining encrypted data from the storage;

decrypting, by the co-processor, the encrypted data from the storage into decrypted data; and providing, by the co-processor, the decrypted data to the main processor.

3. The method of claim 2, wherein decrypting the encrypted data comprises decrypting the encrypted data via a stream decryption engine executed by the co-processor.

4. The method of claim 1, wherein the storage comprises a flash memory storing firmware code and data for the BMC and a host computer.

5. A baseboard management controller (BMC), comprising:

a main processor;

a co-processor; and a storage;

wherein the main processor is configured to:

after power on of the BMC, execute unencrypted co-processor initialization code from the storage to initialize the co-processor, wherein the storage further stores BMC firmware code and data and host initialization component code and data, and wherein the unencrypted co-processor initialization code is stored unencrypted in the storage while at least a portion of the BMC firmware code and data and at least a portion of the host initialization component code and data are stored encrypted in the storage;

obtain data to be written to the storage;

write the data to a shared memory area accessible by both the main processor and the co-processor;

call, through an API, the co-processor to handle the data in the shared memory area;

wherein the co-processor is configured to:

read the data from the shared memory area;

encrypt the data from the shared memory area into encrypted data via a stream encryption engine executed by the co-processor utilizing a unique key derived from a unique identifier stored in a one time programmable (OTP) memory of a hardware component of the BMC, wherein the encrypting is performed in a format-preserving manner such that a size of the data equals a size of the encrypted data; and store the encrypted data to the storage at a target location such that the encrypted data occupies a same set of storage addresses in the storage as the data.

6. The BMC of claim 5, wherein the co-processor is further configured to:

obtain encrypted data from the storage;

decrypt the encrypted data from the storage into decrypted data; and provide the decrypted data to the main processor.

7. The BMC of claim 6, wherein the co-processor is configured to decrypt the encrypted data via a stream decryption engine executed by the co-processor.

8. The BMC of claim 5, wherein the storage comprises a flash memory storing firmware code and data for the BMC and a host computer.

* * * * *